No. 626,533. Patented June 6, 1899.
H. FORSTER.
INSERTIBLE TOOTH FOR DIAMOND SAWS.
(Application filed Mar. 27, 1899.)
(No Model.)

WITNESSES:

INVENTOR
Henry Forster
BY
ATTORNEYS.

UNITED STATES PATENT OFFICE.

HENRY FORSTER, OF NEW YORK, N. Y.

INSERTIBLE TOOTH FOR DIAMOND SAWS.

SPECIFICATION forming part of Letters Patent No. 626,533, dated June 6, 1899.

Application filed March 27, 1899. Serial No. 710,569. (No model.)

*To all whom it may concern:*

Be it known that I, HENRY FORSTER, a citizen of the United States, residing in the city of New York, in the borough of Manhattan and State of New York, have invented certain new and useful Improvements in Insertible Teeth for Diamond Saws, of which the following is a specification.

In inserting diamonds into the teeth of stone-saws they are first inserted into saw-teeth which are usually made of cast-steel or other hard material that is cast around the diamonds by means of a mold, said teeth being then secured into recesses of the saw-blade. For such an insertible tooth Letters Patent No. 474,084 were granted to me under date of May 3, 1892. It was found, however, by practical experience that the ordinary way of inserting the diamonds in the tooth was not satisfactory, as the abrasion of the diamonds produced also the simultaneous abrasion of the tooth. This required considerable extra friction and power without producing a regular cutting action in an absolutely straight line.

The object of my invention is to so improve the cutting edge of the saw-tooth that the friction of the saw with the stone to be cut is greatly reduced and a certain clearance between the diamonds provided by which an easier and more effective cutting action is obtained and a perfectly straight and regular cut or kerf in the stone secured; and the invention consists of an insertible tooth for diamond saws provided with diamonds at its cutting edge and depressions between said diamonds alternating at opposite sides, said diamonds being inserted into the tooth so as to project slightly beyond the body of the tooth, whereby a more effective cutting action is obtained and the friction of the teeth with the stone considerably reduced. The tooth is further provided with depressions between the diamonds in its edge, said edge depressions being of less length than the side depressions.

Figure 1:
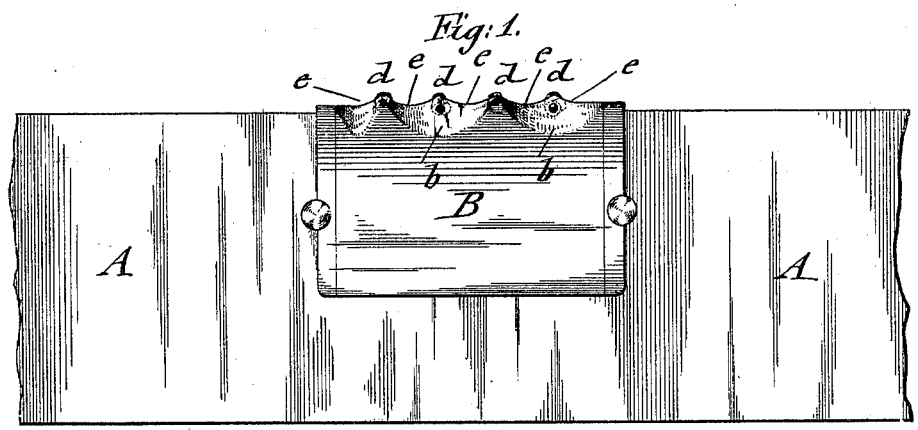
Figure 2:
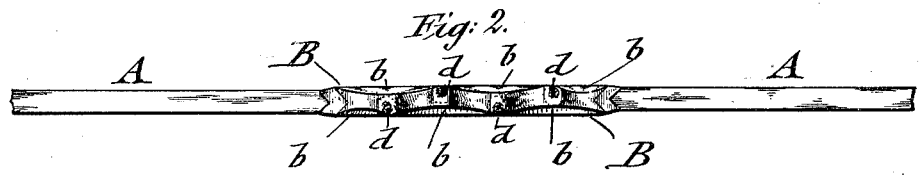

In the accompanying drawings, Figure 1 represents a side elevation of a saw-blade with my improved insertible tooth, and Fig. 2 is a plan view of Fig. 1.

Similar letters of reference indicate corresponding parts.

Referring to the drawings, A represents the saw-blade, and B an insertible saw-tooth, the body of which is set into a recess of the blade A and secured into the same in any approved manner.

The insertible saw-tooth A is made of cast-steel or other hard metal to which a hard temper is imparted, said metal being cast in a mold around the diamonds, so as to hold the same firmly in position. The diamonds $d$ are so inserted into the tooth that they project alternately slightly at both sides of the same beyond the body of the tooth. The edges of the tooth between the diamonds are provided with depressed portions $b$, which alternate at opposite sides of the tooth, so as to form thereby clearances between two adjacent diamonds on each side of the tooth. The edge of the tooth between the diamonds is also depressed, as shown at $e\ e$, Fig. 1, so that an undulating shape is imparted to the sides and edge of the tooth, the side undulations being of greater length than those in the edge. The diamonds are located alternately at the non-depressed positions of the sides and edge, as shown clearly in Figs. 1 and 2. By this arrangement of the diamonds in the tooth the thickness of the tooth at the cutting edge, and thereby the friction of the same with the kerf sawed in the stone, is greatly reduced. The diamonds cut with greater freedom through the stone and produce an absolutely straight and regular kerf.

By alternating the depressions $b\ b$ at opposite sides of the tooth the diamonds are set in such a manner as to correspond to some extent to the "set" of the teeth in ordinary saws. The "bite" of the diamonds on the stone is thereby greatly increased and a more effective tooth for diamond saws supplied.

Having thus described my invention, I claim as new and desire to secure by Letters Patent—

1. An insertible tooth for diamond saws, consisting of a body of cast metal provided with diamonds inserted alternately at opposite sides of said body into the edge of the same, and with depressions in each side of said body between the adjacent diamonds on each side respectively, substantially as set forth.

2. An insertible tooth for diamond saws, consisting of a body of cast metal provided with diamonds inserted alternately at opposite sides of said body into the edge of the same, with depressions in each side of said body between the adjacent diamonds on each side respectively, and with depressions in the upper edge of the body between the diamonds of both sides of the body, substantially as set forth.

In testimony that I claim the foregoing as my invention I have signed my name in presence of two subscribing witnesses.

HENRY FORSTER.

Witnesses:
PAUL GOEPEL,
M. HENRY WURTZEL.